United States Patent
Nakamura et al.

(10) Patent No.: US 6,223,302 B1
(45) Date of Patent: *Apr. 24, 2001

(54) INFORMATION RECORDING/REPRODUCING UNIT AND INFORMATION RECORDING/REPRODUCING DATA

(75) Inventors: Yoshimitsu Nakamura, Neyagawa; Yukinori Okazaki, Hirakata, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,878
(22) PCT Filed: Aug. 7, 1996
(86) PCT No.: PCT/JP96/02222
§ 371 Date: Feb. 18, 1998
§ 102(e) Date: Feb. 18, 1998
(87) PCT Pub. No.: WO97/07505
PCT Pub. Date: Feb. 27, 1997

(30) Foreign Application Priority Data

Aug. 18, 1995 (JP) .................................................... 7-210292

(51) Int. Cl.$^7$ ...................................................... G06F 11/00
(52) U.S. Cl. .................................................................. 714/8
(58) Field of Search ........................... 714/8, 54; 710/52; 369/58, 32, 47, 54, 36, 275.3

(56) References Cited

U.S. PATENT DOCUMENTS

| | | |
|---|---|---|
| 3,997,876 * | 12/1976 | Frust .................................. 340/172.5 |
| 4,656,532 | 4/1987 | Greenberg et al. . |
| 5,025,431 | 6/1991 | Naito . |
| 5,034,914 | 7/1991 | Osterlund . |
| 5,237,553 | 8/1993 | Fukushima et al. . |
| 5,687,160 * | 11/1997 | Aotake et al. ..................... 369/275.3 |
| 5,732,067 * | 3/1998 | Aotake et al. ..................... 369/275.3 |

FOREIGN PATENT DOCUMENTS

| | | |
|---|---|---|
| 0 347 032 A2 | 4/1989 | (EP) . |
| 0 559 142 A2 | 9/1993 | (EP) . |
| 1404541 | 9/1975 | (GB) . |
| 3-189965 | 8/1991 | (JP) . |

* cited by examiner

Primary Examiner—Robert W. Beausoliel, Jr.
Assistant Examiner—Pierre Elisca
(74) Attorney, Agent, or Firm—Ratner & Prestia

(57) ABSTRACT

An information recording/reproducing device and a medium are improved in reliability by making medium managing information usable even when a defective sector exists in the medium managing information area of the medium. The identifier of medium managing information, the information about the position where the medium managing information is recorded which is the information about the position of the sector in use, or the information about the position where a defect exists in the medium managing information area, which is the information about the position of the defective sector, are read from the medium managing area of the medium (3) and all the information is stored in a RAM (8) by using a medium managing information position manager. A reproducer and a recorder are controlled based on the information. Therefore, the medium managing information is correctly recorded and the reliability of the data of the information recording/reproducing device and the medium is improved, because the medium managing information is not recorded in the defective section.

8 Claims, 15 Drawing Sheets

| Byte | Contents | |
|---|---|---|
| 0 | ( 44h ) DMS Identifier | 300 |
| 1 | ( 4Dh ) DMS Identifier | |
| 2 ~ 5 | Hold | 301 |
| 6 | PDL Identifier | 302 |
| 7 | PDL Sector Number ( n ) | 303 |
| 8 | Address of PDL Sector 1 | 304 |
| 9 | Address of PDL Sector 1 | |
| 10 | Address of PDL Sector 1 | |
| 11 | Address of PDL Sector 1 | |
| ⋮ | ⋮ | |
| x | Hold | |
| x + 1 | Hold | |
| x + 2 | SDL Identifier | 305 |
| x + 3 | SDL Sector Number ( m ) | 306 |
| x + 4 | Address of SDL Sector 1 | 307 |
| x + 5 | Address of SDL Sector 1 | |
| x + 6 | Address of SDL Sector 1 | |
| x + 7 | Address of SDL Sector 1 | |
| ⋮ | ⋮ | |
| y | Hold | |
| ⋮ | ⋮ | |
| 511 | | |

| Byte | | Contents |
|---|---|---|
| 0 | 44h | DMS Identifier |
| 1 | 4Dh | DMS Identifier |
| 2 | 00h | Hold |
| 3 | 00h | Hold |
| 4 | 00h | Hold |
| 5 | 00h | Hold |
| 6 | 01h | PDL Identifier |
| 7 | 02h | PDL Sector Number ( n ) |
| 8 | 00h | Address of PDL Sector 1 |
| 9 | 00h | Address of PDL Sector 1 |
| 10 | 00h | Address of PDL Sector 1 |
| 11 | 02h | Address of PDL Sector 1 |
| 12 | 00h | Address of PDL Sector 2 |
| 13 | 00h | Address of PDL Sector 2 |
| 14 | 00h | Address of PDL Sector 2 |
| 15 | 03h | Address of PDL Sector 2 |
| 16 | 00h | Hold |
| 17 | 00h | Hold |
| 18 | 02h | SDL Identifier |
| 19 | 02h | SDL Sector Number ( m ) |
| 20 | 00h | Address of SDL Sector 1 |
| 21 | 00h | Address of SDL Sector 1 |
| 22 | 00h | Address of SDL Sector 1 |
| 23 | 04h | Address of SDL Sector 1 |
| 24 | 00h | Address of SDL Sector 2 |
| 25 | 00h | Address of SDL Sector 2 |
| 26 | 00h | Address of SDL Sector 2 |
| 27 | 05h | Address of SDL Sector 2 |
| 28 | 00h | Hold |
| ⋮ | ⋮ | |
| 511 | 00h | |

FIG. 4

PDL Sector 1

| Byte | Contents |
|---|---|
| 0 | PDL Identifier 1 ( 01h ) |
| 1 | PDL Identifier 2 ( 01h ) |
| 2 | Location Number of PDL Sector ( 00h ) |
| 3 | Number of PDL Sector ( 02h ) |
| 4 ~ 5 | Recording Times of PDL ( 0003h ) |
| 6 ~ 7 | Number of PDL Directories ( 00C8h ) |
| 8 ~ 11 | Address of First Defective Sector |
| 12 ~ 15 | Address of Second Defective Sector |
| ⋮ | ⋮ |
| (n*4) ~ (n*4)+3 | Address of "n"th Defective Sector |
| ⋮ | ⋮ |
| 508 ~ 511 | Address of 126th Defective Sector |

PDL Sector 2

| Byte | Contents |
|---|---|
| 0 | PDL Identifier 1 ( 01 ) |
| 1 | PDL Identifier 2 ( 01 ) |
| 2 | Location Number of PDL Sector ( 01 ) |
| 3 | Number of PDL Sector ( 02 ) |
| 4 ~ 5 | Recording Times of PDL ( 0003h ) |
| 6 ~ 7 | Number of PDL Directories ( 00C8h ) |
| 8 ~ 11 | Address of 127th Defective Sector |
| 12 ~ 15 | Address of 128th Defective Sector |
| ⋮ | ⋮ |
| 304 ~ 307 | Address of 200th Defective Sector |
| 308 ~ 511 | Hold |

FIG. 7

SDL Sector 1

| Byte | Contents |
|---|---|
| 0 | SDL Identifier 1 ( 02h ) |
| 1 | SDL Identifier 2 ( 01h ) |
| 2 | Location Number of PDL Sector ( 00h ) |
| 3 | Number of SDL Sector ( 02h ) |
| 4 ~ 5 | Recording Times of SDL ( 0064h ) |
| 6 ~ 7 | Number of SDL Directories ( 0064h ) |
| 8 ~ 11 | Address of First Defective Sector |
| 12 ~ 15 | Address of First Alternate Sector |
| 16 ~ 19 | Address of Second Defective Sector |
| 20 ~ 23 | Address of Second Alternate Sector |
| ⋮ | ⋮ |
| (n*8) ~ (n*8)+7 | Address of "m"th Defective Sector |
| (m*8)+8 ~ (m*8)+15 | Address of "m"th Alternate Sector |
| ⋮ | ⋮ |
| 504 ~ 507 | Address of 63rd Defective Sector |
| 508 ~ 511 | Address of 63rd Alternate Sector |

SDL Sector 2

| Byte | Contents |
|---|---|
| 0 | SDL Identifier 1 ( 02h ) |
| 1 | SDL Identifier 2 ( 01h ) |
| 2 | Location Number of SDL Sector ( 01h ) |
| 3 | Number of SDL Sector ( 02h ) |
| 4 ~ 5 | Recording Times of SDL ( 0064h ) |
| 6 ~ 7 | Number of SDL Directories ( 0064h ) |
| 8 ~ 11 | Address of 64th Defective Sector |
| 12 ~ 15 | Address of 64th Alternate Sector |
| 16 ~ 19 | Address of 65th Defective Sector |
| 20 ~ 23 | Address of 65th Alternate Sector |
| ⋮ | ⋮ |
| 304 ~ 307 | Address of 100th Defective Sector |
| 308 ~ 311 | Address of 100th Alternate Sector |
| 312 ~ 511 | Hold |

FIG. 8

| | | |
|---|---|---|
| 02h 02h | Defect List Identifier | 800 |
| 00h | Hold | 801 |
| 00h 01h | Number of Defect Directories | 802 |
| | First Defective Sector Address ( Address X1, for Example ) | 803 |
| | First Alternate Sector Address ( Address Y1, for Example ) | 804 |
| | Uncataloged Field | 805 |

FIG. 14(a)

| | |
|---|---|
| 02h 02h | Defect List Identifier |
| 00h | Hold |
| 00h 02h | Number of Defect Directories |
| | First Defective Sector Address ( Address X1, for Example ) |
| | First Alternate Sector Address ( Address Y1, for Example ) |
| | ⋮ |
| | 64th Defective Sector Address ( Address X2, for Example ) |
| | 64th Alternate Sector Address ( Address Y2, for Example ) |
| | Uncataloged Field |

FIG. 14(b)

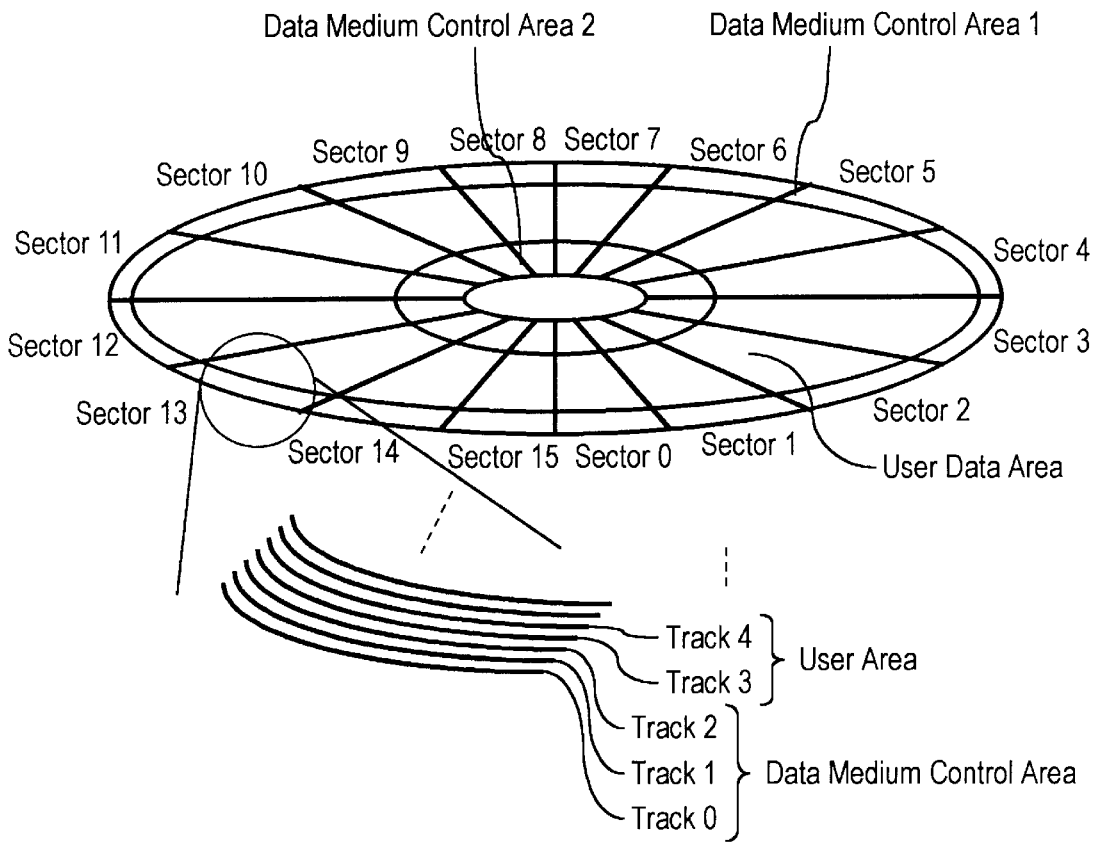
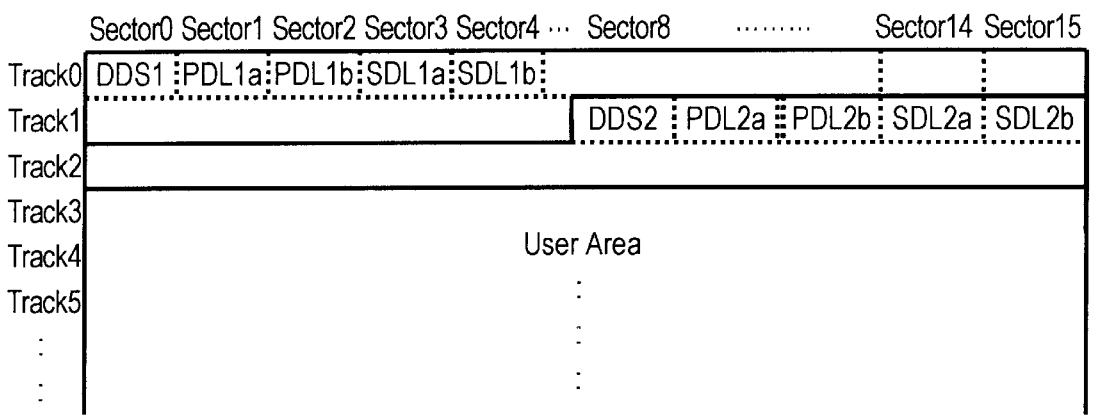
FIG. 15

INFORMATION RECORDING/ REPRODUCING UNIT AND INFORMATION RECORDING/REPRODUCING DATA

THIS APPLICATION IS A U.S. NATIONAL PHASE APPLICATION OF PCT INTERNATIONAL APPLICATION PCT/JP96/02222.

FIELD OF THE INVENTION

The present invention relates to an information recording/ reproducing unit, whereby recording and reproducing of data are performed, and a data medium for use in the foregoing recording and reproducing of data.

BACKGROUND OF THE INVENTION

An information recording/reproducing unit has so far been employing such a recording medium control system as described typically in the standards ISO10089, ISO10090 and ISO10091 for use with a magneto-optic disk, for example, whereby the recording area of a recording medium is broadly divided into three areas (user area, alternate area and data medium control area).

A user area is used for recording/reproducing the data required by higher level units. An alternate area is used as an alternate sector for alternate processing, wherein data are recorded, by substituting a defective sector in the user area. A data medium control area is used for recording/ reproducing a defective list and alternate list to control the alternate processing.

When data is recorded in a user area of a recording medium, a determination is made on whether recording errors are generated or not, or whether data is correctly recorded or not, by a method of comparing signals obtained by reproducing immediately after recording the data with the data that was intended for recording, and the like for each respective sector, for example.

In general, recording errors are generated due to partial defects of a recording medium itself and a malfunction in the record system of a recording/reproducing unit.

When recording errors are found to have been generated, the previous data is again recorded in an alternate sector within an alternate area by substituting the defective sector of the user area wherein recording of data was made before, and at the same time defects control information that provides positional information on the defective sector and alternate sector is recorded in the data medium control information area.

How these user area, alternate area and data medium control information area are structured can be determined arbitrarily. For example, a track of data medium on the disk of an information recording/reproducing unit as shown in FIG. 15 is defined as one of a plurality of paths formed on the data medium by the division thereof performed along the radius of the disk and each respective track of the above is divided along the direction of rotation into 16 segments, each being called a sector.

Assuming there are a data medium control information area, user data area and alternate area on the foregoing data medium, for example, FIG. 12 shows how a structure is formed on the record medium.

Here, 601 indicates a first data medium control information area, 602 indicates a second data medium control information area, 603 indicates a user area, 604 indicates an alternate area, 605 indicates a third data medium control information area and 606 indicates a fourth data medium control information area. The data medium control information is formed of the user area 603 detected at the time of initialization of a recording medium 600, primary defect lists (PDLs) 608*a* and 608*b* that keep the positional information on an alternate sector in the alternate area 604, secondary defect lists (SDLs) 609*a* and 609*b* that indicate a defective sector detected at the time of data recording in the user area and the positional information on an alternate sector in the alternate area with data recorded by substituting the defective sector, and a disk definition structure (DDS) 607 that indicates the start of data medium control information, fixed start addresses of PDLs 608*a* and 608*b* and SDLs 609*a* and 609*b* and a data structure on the record medium (positional information on ROM data, RAM data and the like).

In other words, the data medium control information comprises DDS607, PDL608*a* and 608*b*, and SDL609*a* and 609*b*, and the similar data are recorded in each respective data medium control information area.

A RAM612 is a memory wherein reproduced data medium control information is stored. The description that follows employs SDL609*a* and 609*b* whereby data medium control information is updated when a defective sector is found.

The present example of prior art adopts a 2 sector state for both PDL and SDL.

When a recording medium 600 is loaded in a recording/ reproducing unit for execution of data recording/ reproducing, DDS607, PDL608*a* and 608*b*, and SDL609*a* and 609*b* are reproduced and then stored in a RAM612.

When data medium control information is changed, the SDL stored in the RAM 612 is recorded in each of the first to fourth data medium control information areas 601, 602, 605 and 606 on the recording medium, respectively. Accordingly, every time when a defective sector in the user area is detected, positional information on the defective sector, an alternate sector replacing the defective sector and the like is added to the RAM612, thereby updating the SDL in the RAM612.

The SDL after the foregoing updating is recorded in each of the first to fourth data medium control information areas 601, 602, 605 and 606 on the recording medium, respectively.

The SDL stored in the RAM612 is recorded in each of the first to fourth data medium control information areas 601, 602, 605 and 606 on the recording medium 600, respectively.

An example of the contents of these SDL809*a* and 809*b* is shown in FIG. 14(*a*), wherein the data unit of SDL is 1 byte, the reference numeral 800 shows a defect list identifier formed of 2 byte fixed data, the reference numeral 801 shows a reserved field held for future expansion, the reference numeral 802 shows the number of defective sectors held in the SDL, the reference numeral 803 is the address to show a location of a defective sector, the reference numeral 804 is the address to show a location of an alternate sector substituting the foregoing defective sector, and the reference 805 shows a blank field set aside for defective sectors that are detected in future.

Here, each respective positional information on a pair of defective sector and alternate sector is expressed by employing the data 803 and 804 formed of 8 bytes.

According to this SDL, it is understood that the number of defect cataloged is 1, the address (X1) is a defective sector and the address (Y1) is an alternate sector replacing the foregoing defective sector.

Thus, an inability to use data medium control information due to partial defects on a recording medium and the like has been prevented in the prior art by recording data medium control information in a plurality of data medium control information areas. However, when the data medium control information in RAM612 is recorded on a recording medium 600, the data of the RAM612 are sometimes not updated correctly because of partial defects on the recording medium.

At this time, the data medium control information area is not allowed to read-in, resulting in a reduction of usable data medium control information areas by one.

Therefore, if there are any defective sectors, even only one, in the data medium control information area, the use of the data medium control information area becomes impossible.

More specifically, a problem was encountered in the past that the entire data medium could not be used due to the existence of 4 defective sectors.

With the alternate list and defect list in the prior art, recording locations are fixed as shown in FIG. 12 and assuming that the number of byte for 1 sector is 512 bytes and defective and alternate sectors as many as 63 are cataloged in SDL, for example, this SDL becomes 512 bytes, resulting in using up exactly 1 sector.

Further, when an address (X2) to be used as the next SDL happens to be a defective sector, a sector on a certain user area is a defective sector. Assuming that recording is executed on that sector which is a defective sector, a recording error is caused, thereby generating an alternate sector with new addresses of defective sector and alternate sector cataloged in the SDL. As a result, the cataloged number becomes 64 and the number of byte used counts 520 bytes, exceeding the number of byte for 1 sector with a resulting addition of 1 sector to the SDL. This added SDL sector is recorded on a defective sector, resulting in an inability to use this SDL.

Thus, the inability to use an SDL that has been usable till halfway happened all over the data medium control information area, resulting in a problem of not allowing recording or reproducing to be performed in any areas of the entire data medium.

SUMMARY OF THE INVENTION

The present invention relates to an information recording/reproducing unit whereby data is recorded/reproduced and aims at enhancing the reliability of data recorded on a data medium by the information recording/reproducing unit.

In order to achieve the foregoing objective, the present invention discloses an information recording/reproducing unit comprising:

a data medium that allows recording/reproducing of data to be made on/from;

a recording means for recording data on a data medium; and a reproducing means for reading out data from a data medium, wherein data medium control information is provided in the data medium formed of a single sector or a plurality of sectors for controlling attributes of the data medium, attributes of areas inside of the data medium and defect information, and positions for recording the data medium control information are not fixed.

Particularly, the present invention discloses an information recording/reproducing unit comprising:

an identifier adding means for adding data medium control information identifiers that identify data medium control information;

a defective sector detecting means for recording data medium control information by avoiding defective sectors;

an identifier discriminating means for selecting data medium control information identifiers at the time of reproducing and using data medium control information; and a restructuring means of data medium control information for making connections of each respective data medium control information sector formed of a single sector or a plurality of sectors according to the selected identifiers and structuring into single data medium control information, wherein data medium control information areas are not fixed.

Furthermore, the present invention discloses an information recording/reproducing unit characterized by having at a specified position on the data medium data medium control positional information that is the positional information on each respective sector of the data medium control information and a means for positional controlling of data medium control information, whereby data medium control information is recorded/reproduced according to the foregoing positional information, wherein data medium control information areas are not fixed.

Moreover, the present invention discloses an information recording/reproducing unit characterized by having on a data medium, whereby data can be recorded/reproduced, data medium control information that is the information for controlling the attributes of a data medium and also of areas in the data medium and defect information at locations that are not fixed.

Therefore, according to the present invention's information recording/reproducing unit wherein data recording is performed by avoiding defective sectors, even when defective sectors are formed in the areas of the defect list and alternate list due to dusts and scars in the defective list and alternate list, initial defects of the data medium and deterioration of the data medium caused by repeated recordings, there is no possibility that the list in each respective area becomes unusable, thus allowing secure recording of data medium control information in the data medium to take place. As a result, the possibility of failure in recording data medium control information correctly due to defects of data medium is eliminated, thereby making it unlikely to happen that the data medium control information can not be retrieved. Thus, it is prevented from happening that all the user data on a data medium become unretrievable just because data medium control information cannot be read out due to a failure in having the data medium control information correctly recorded because of defects in the data medium. In other words, the reliability of data recorded in a data medium by use of an information recording/reproducing unit is allowed to be enhanced greatly.

BRIEF DESCRIPTION OF THE DRAWINGS

FIG. 3 shows a format of DMS that becomes the positional information of data medium control information in the first exemplary embodiment of the present invention.

FIG. 4 is the contents of DMS that show an example of the status wherein 2 sectors of PDL and 2 sectors of SDL of DMS that becomes the positional information of data medium control information in the first exemplary embodiment of the present invention.

FIG. 7 shows an example of the contents of PDL in the second exemplary embodiment of the present invention.

FIG. 8 shows an example of the contents of SDL in the second exemplary embodiment of the present invention.

FIGS. 14A–14B are an example of the format for SDL being an alternate list.

FIG. 15 is a diagram to describe how data medium control information is arranged on an ordinary disk type information recording medium.

PREFERRED EMBODIMENTS OF THE INVENTION

Next, a detailed explanation will be made on an exemplary embodiments of the present invention with reference to drawings.

Figure 1:
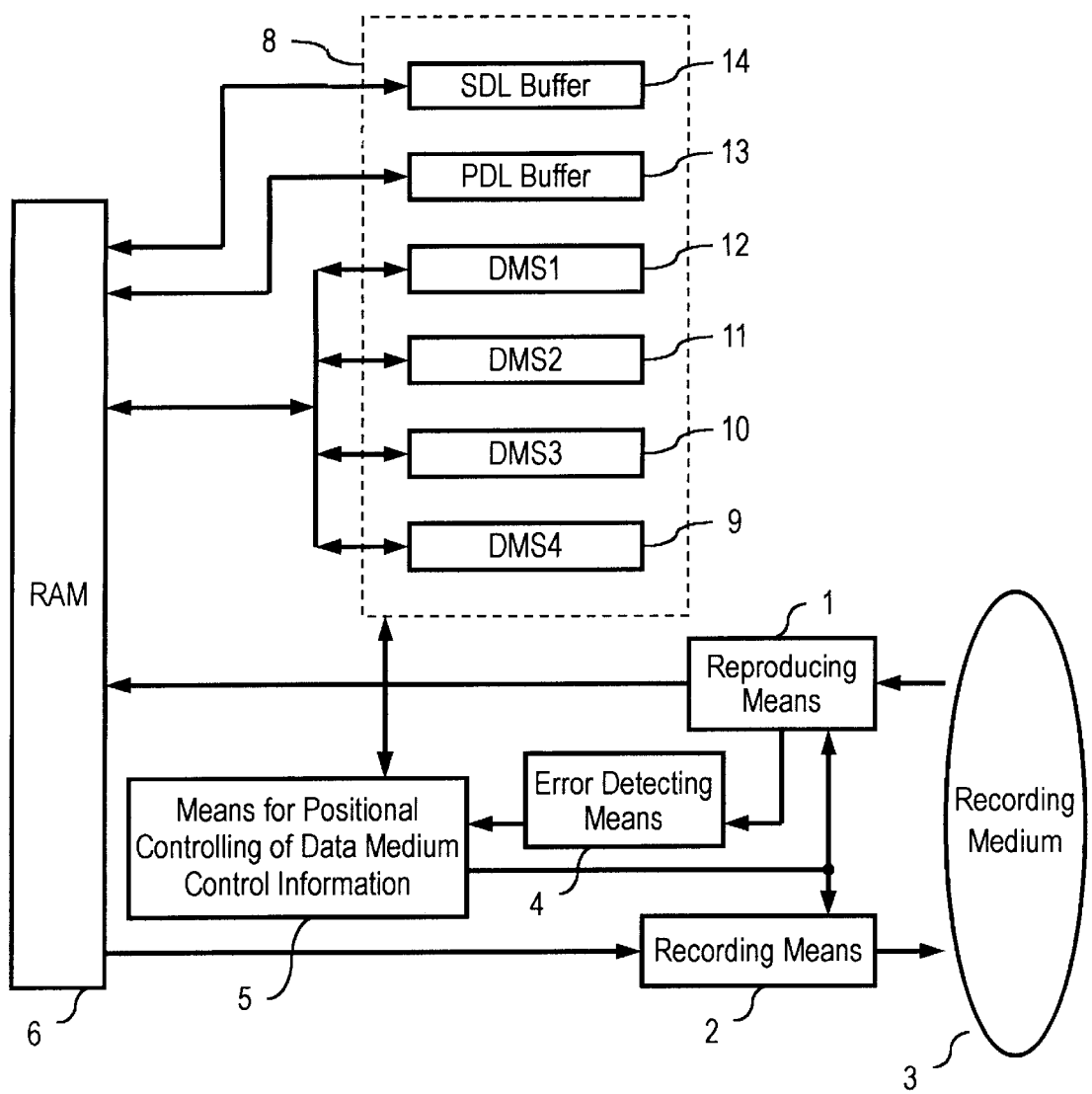
FIG. 1 is a block diagram of an information recording/reproducing unit in a first exemplary embodiment of the present invention.

FIG. 1 is a block diagram to show only the essential part of an information recording/reproducing unit in an exemplary embodiment of the present invention. In addition to what is described in FIG. 1, an information recording/reproducing unit requires an interface controlling means connected with higher level units, microprocessors that control the whole units and the like, but these are omitted from FIG. 1 since these have nothing to do with the present invention.

In FIG. 1 describing a first exemplary embodiment, the reference numeral 3 is a recording medium where data from higher level units is recorded/reproduced, reference numeral 8 is a data medium control information storage memory (RAM) wherein each of the reference numerals 9, 10, 11 and 12 shows positional information of data medium control information (DMS) in each of 4 data medium control information areas, reference numeral 13 shows a defective list (PDL), reference numeral 14 shows an alternate list (SDL), reference numeral 1 is a reproducing means for reproducing signals from the recording medium and changing the signals to binary signals, reference numeral 2 is a recording means for recording data and data medium control information on a data medium, reference numeral 6 is a buffer where each of the data medium control information read out by the reproducing means 6 is held temporarily, reference numeral 4 is an error detecting means for finding whether errors are generated or not during the reproducing and reference numeral 5 is a means for positional controlling of data medium control information for recording data medium control information or controlling reproducing positions.

Figure 2:
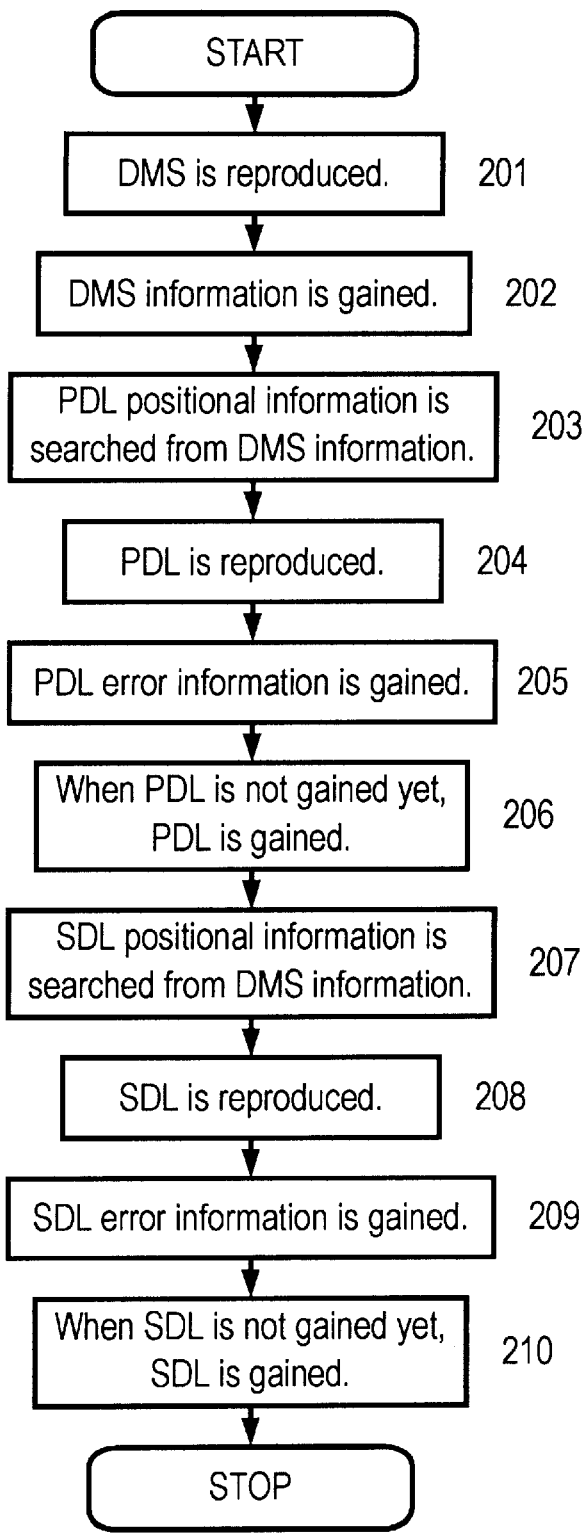
FIG. 2 is a flow chart to show reproducing steps of the data medium control information area in the first exemplary embodiment of the present invention.

FIG. 2 is a chart for explaining the steps to reproduce data medium control information as employed in the present invention. The data medium control information on the recording medium 3 is read out by the reproducing means 1 to obtain DMS, and then PDL and SDL are read out according to the positional information of data medium control information. At that time, each respective DMS and also PDL and SDL are stored in a data medium control information storage memory 8. Further, by use of the error detecting means 4 a determination is made on whether errors are generated or not at the time of recording or reproducing.

FIG. 3 is an example of the positional information of data medium control information as used in the present invention. The positional information of data medium control information deals with the foregoing DMS. The data unit of DMS is 1 byte and the reference numeral 300 is a DMS identifier formed of 2 byte fixed data, reference numeral 301 is a reserved field prepared for future expandability, reference numeral 302 is a PDL identifier to show PDL positional information, reference numeral 303 is the number of sectors that constitute PDL, reference numeral 304 shows each respective sector address that constitutes PDL, reference numeral 305 is an SDL identifier to show SDL positional information, reference numeral 306 is the number of sectors that constitute SDL and reference numeral 307 shows each respective sector address that constitutes SDL.

Next, how the problems described in the above are solved in the present exemplary embodiment will be explained.

Figure 5:
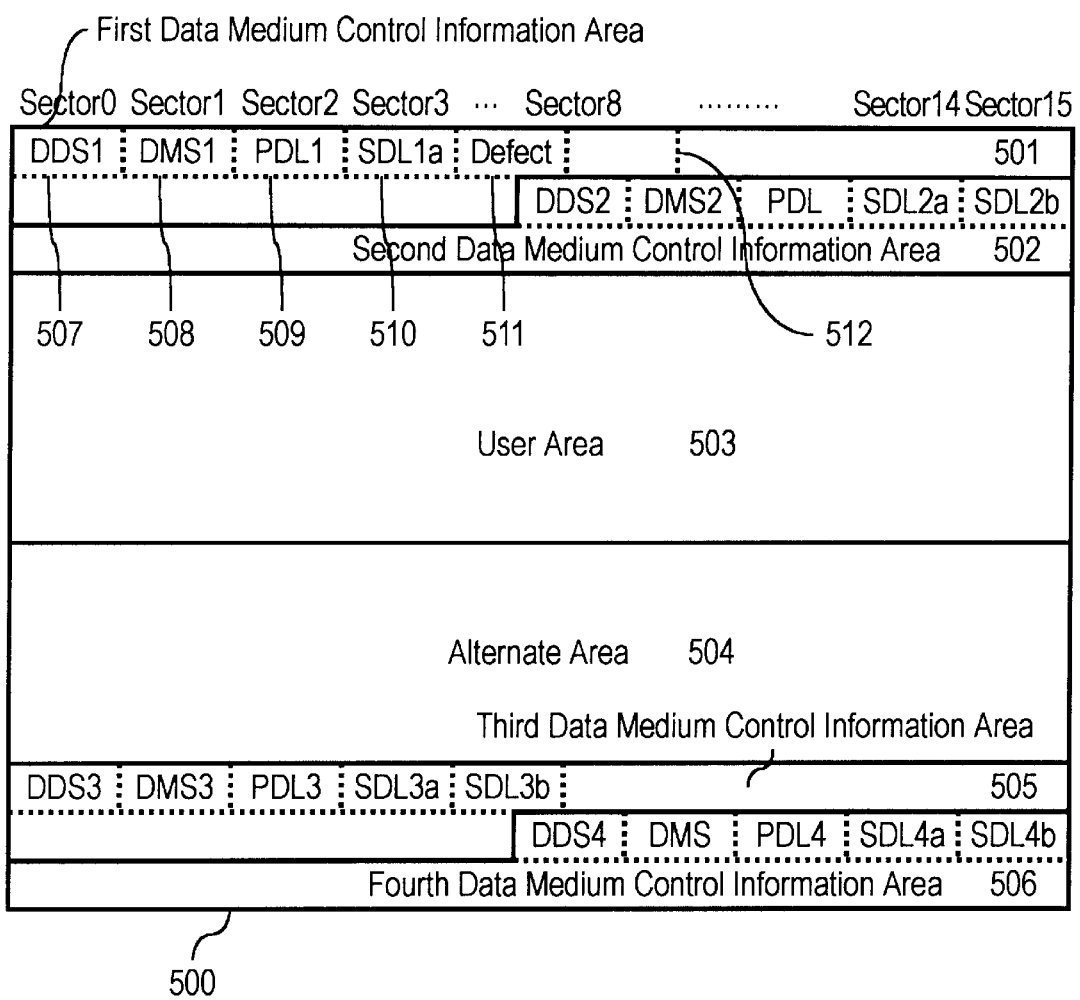
FIG. 5 is a layout diagram to show an example of the data medium wherein 2 sectors of PDL and 2 sectors of SDL exist in the first exemplary embodiment of the present invention.

Suppose that one sector of the recording medium comprises 512 bytes, the contents of DMS are as shown in FIG. 4 and arranged on the recording medium as shown in FIG. 5, SDL is constituted as shown in FIG. 14 in the same way as the prior art, and as many as 63 alternate sectors are already cataloged in SDL. Then, recording commands are issued from higher level units and against the designated area a detection is made that a recording operation address (X2) is a defective sector. The data designated to be recorded on the foregoing defective sector is recorded on an alternated sector at an address (Y2) of the alternate area. These defective sector and alternate sector are cataloged in SDL of RAM7 as shown in FIG. 3(b). As a result, the cataloged number of alternate sectors becomes 64, thereby the number of sector in SDL being increased to two sectors since the number of byte in SDL exceeds 512.

Since the contents of SDL have been changed, SDL is recorded in the data medium control area of the data medium.

This recording operation is performed against 4 data medium control areas. The recording operation against one of the foregoing data medium control areas will be explained below.

As a first step, a sector 511 is added to the sectors in use of SDL inside of DMS. A recording operation is performed against the first sector of SDL according to the SDL address in the foregoing DMS. Since the first sector of the SDL is not a defective sector, the recording operation is finished in a normal way. Then, a recording operation is performed for the second sector of SDL, resulting in an erroneous termination because the sector 511 is a defective sector. Therefore, a sector 512 of SDL is cataloged in DMS and a recording operation is performed against the sector 512, resulting in a normal termination of the recording operation since the sector 512 is not a defective sector.

Figure 6:
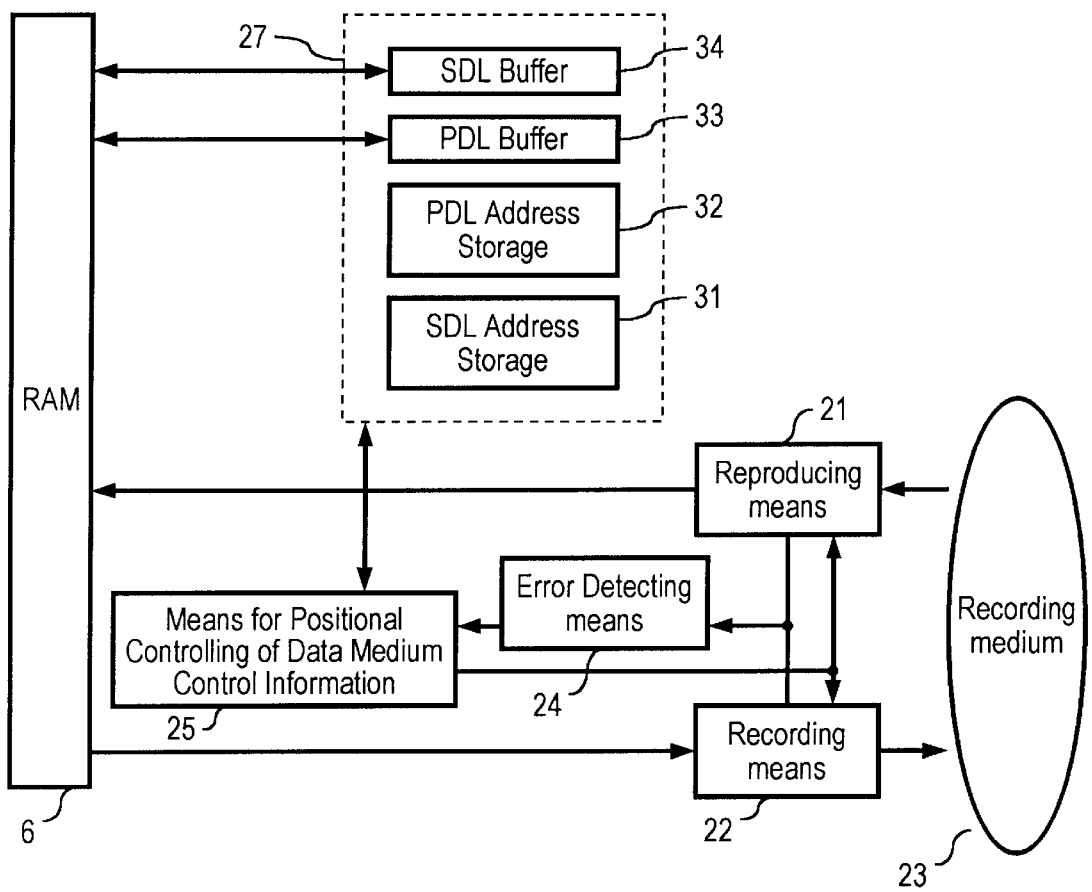
FIG. 6 is block diagram of an information recording/reproducing unit in a second exemplary embodiment of the present invention.

An information recording/reproducing unit in a second exemplary embodiment of the present invention is described in a block diagram of FIG. 6, wherein the reference numeral 23 is a recording medium to record/reproduce data from higher level units, reference numeral 27 is a data medium control information storage memory (RAM) comprising a defective list (PDL) indicated by the reference numeral 33 and an alternate list (SDL) indicated by the reference numeral 34, reference numeral 21 is a reproducing means for reproducing signals from the recording medium 23 and changing the signals to binary signals, reference numeral 22 is a recording means for recording data and data medium control information on a data medium, reference numeral 26 is a buffer where each respective piece of the data medium control information read out by the reproducing means 21 is held temporarily, reference numeral 24 is an error detecting means for finding whether errors are generated or not during the process of reproducing and reference numeral 25 is a means for positional controlling of data medium control information for recording data medium control information or controlling reproducing positions.

Figure 9:
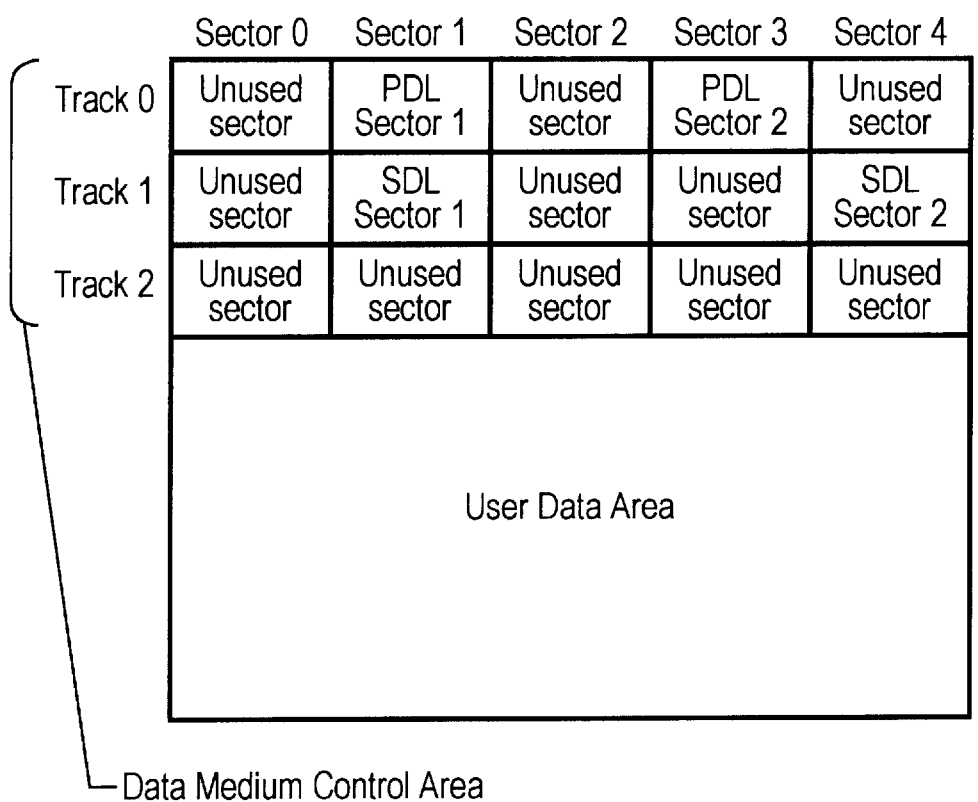
FIG. 9 is a layout diagram to show an example of the data medium wherein 2 sectors of PDL and 2 sectors of SDL exist in the second exemplary embodiment of the present invention.

The data medium control information on the recording medium 23 is accepted by the buffer 26 through the reproducing means as a whole like FIG. 9, for example. At that time, a determination is made on which of PDL or SDL each respective sector to be included in and where to be located therein by the means for positional controlling of data medium control information 25, utilizing each respective control information identifier located at the head of each respective selector, thereby restructuring PDL and SDL.

FIG. 7 shows an example of the contents of PDL used in the present invention. According to FIG. 7, as many as 200 defective sectors are cataloged in the PDL and the recording operation has taken place 3 times in total.

How the PDL is restructured from each respective sector by the means for positional controlling of data medium control information is described below.

From the sectors accepted to the buffer by the means for positional controlling of data medium control information, sectors with PDL identifier are extracted and from the extracted sectors with PDL identifier are further extracted sectors having the largest number of recording times.

Each time when one recording operation is finished, "1" is added to the previous number, thus establishing the number of PDL recording and identifying the PDL that has been recorded lastly. Here, suppose the recording operation has been performed 3 times and the PDL with the number of recording times of 3 are selected. Then, the PDL with the number of recording times of 3 are rearranged according to the order of PDL selector location number. Thus, the PDL located in the data medium control information area are restructured and stored in a PDL storage area and also each respective sector's address of the PDL used in the foregoing restructuring is stored in a PDL address storage area in the memory storing data medium control information.

FIG. 8 shows an example of the contents of SDL used in the present invention. As many as 100 defective sectors are cataloged in the SDL, indicating that recordings of 100 times in total have been performed.

Next, an explanation will be made on how this SDL is restructured from each respective sector by the means for positional controlling of data medium control information.

From the sectors accepted to the buffer by the means for positional controlling of data medium control information, sectors having an SDL identifier are extracted and from the foregoing sectors with SDL identifier are further extracted the ones that have the largest number of recording times.

Each time when one recording operation is finished, "1" is added to the previous number, thus establishing the number of SDL recording and identifying the SDL that has been recorded lastly. Here, suppose the recording operation has been performed 100 times and the SDL with the number of recording times of 100 are selected. Then, the SDL with the number of recording times of 100 are rearranged according to the order of SDL selector location number. Thus, the SDL located in the data medium control information area are restructured and stored in a SDL storage area and also each respective sector's address of the SDL used in the foregoing restructuring is stored in a SDL address storage area in the memory storing data medium control information.

FIG. 9 shows an example of the status on the foregoing disk. The unused sectors of FIG. 9 are the sectors that could not be used due to defects and the like or could not be needed to use. PDL1 and PDL2 are the sectors used as PDL and SDL1 and SDL2 are the sectors used as SDL.

Next, an explanation will be made on how recordings are performed when defects are found on a user area and the number of sectors of SDL is increased by registering an alternate sector.

Figure 10:
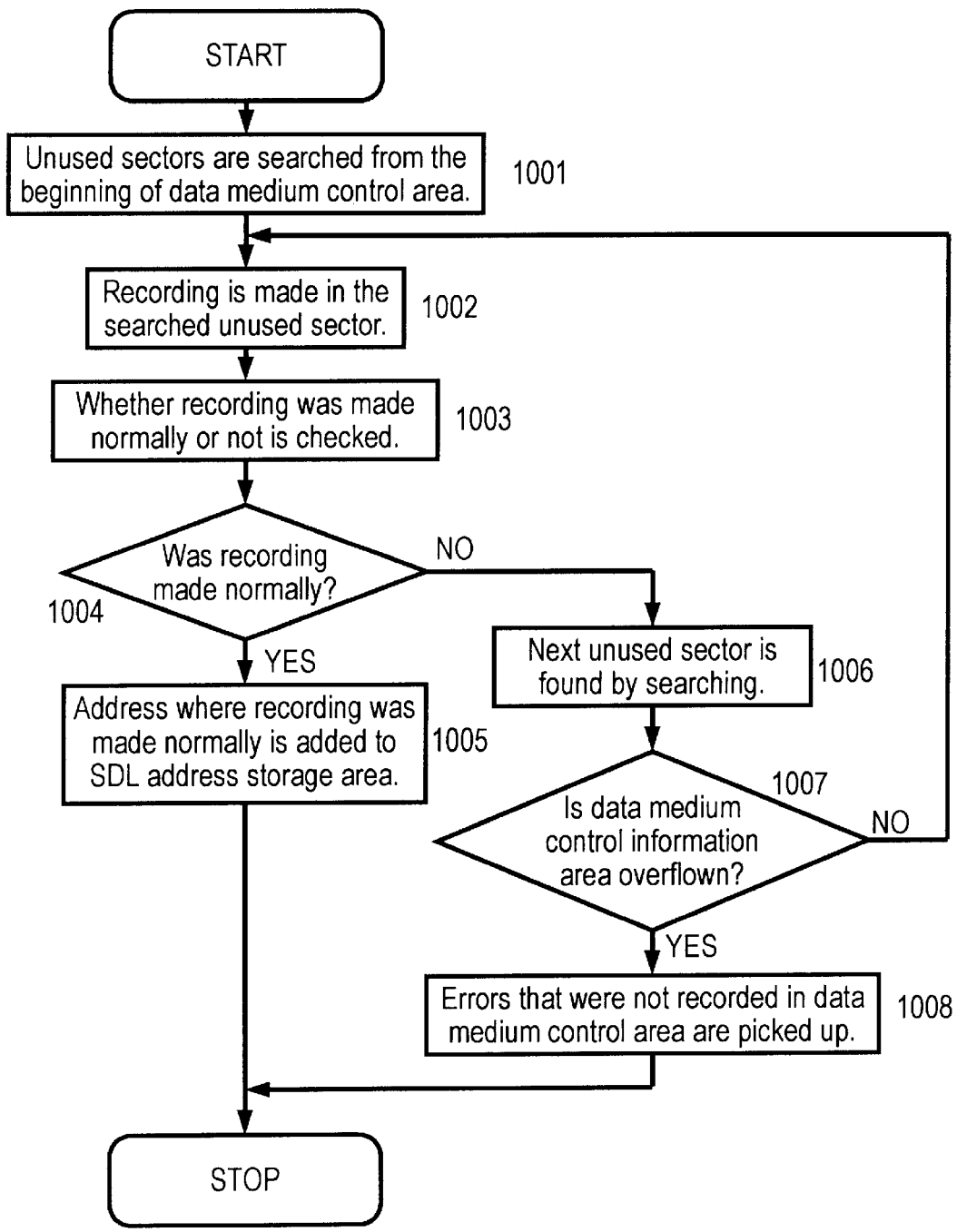
FIG. 10 is a flow chart to show how SDL is recorded in the second exemplary embodiment of the present invention.

(1) An explanation will be made with reference to the flow chart as shown in FIG. 10. First of all, a first unused sector address is searched in the data medium control area and a recording is performed on the unused sector.

When the recording has been performed normally, this address is added to an area storing the SDL address and the processing is ended. When the recording has not been performed normally, the next unused sector address is searched and an attempt is made to record the same content in an SDL sector on the foregoing next unused sector address. Accordingly, recordings on unused sectors are attempted one after another in the data medium control information area. When recordings have been performed normally, the addresses normally recorded are added to an area storing the SDL address and the processing is ended.

Figure 11:
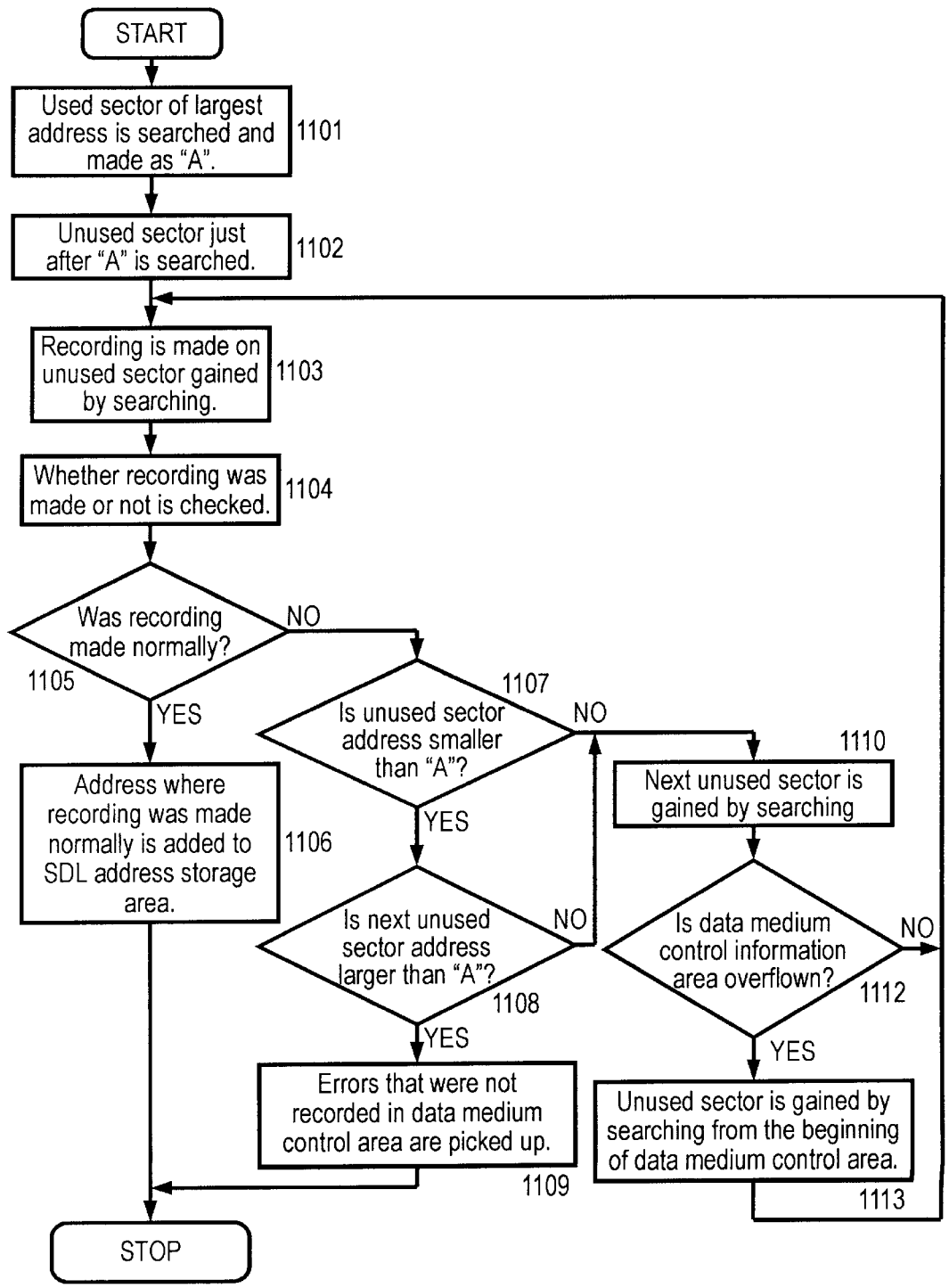
FIG. 11 is a flow chart to show how SDL is recorded in the second exemplary embodiment of the present invention.
Figure 12:
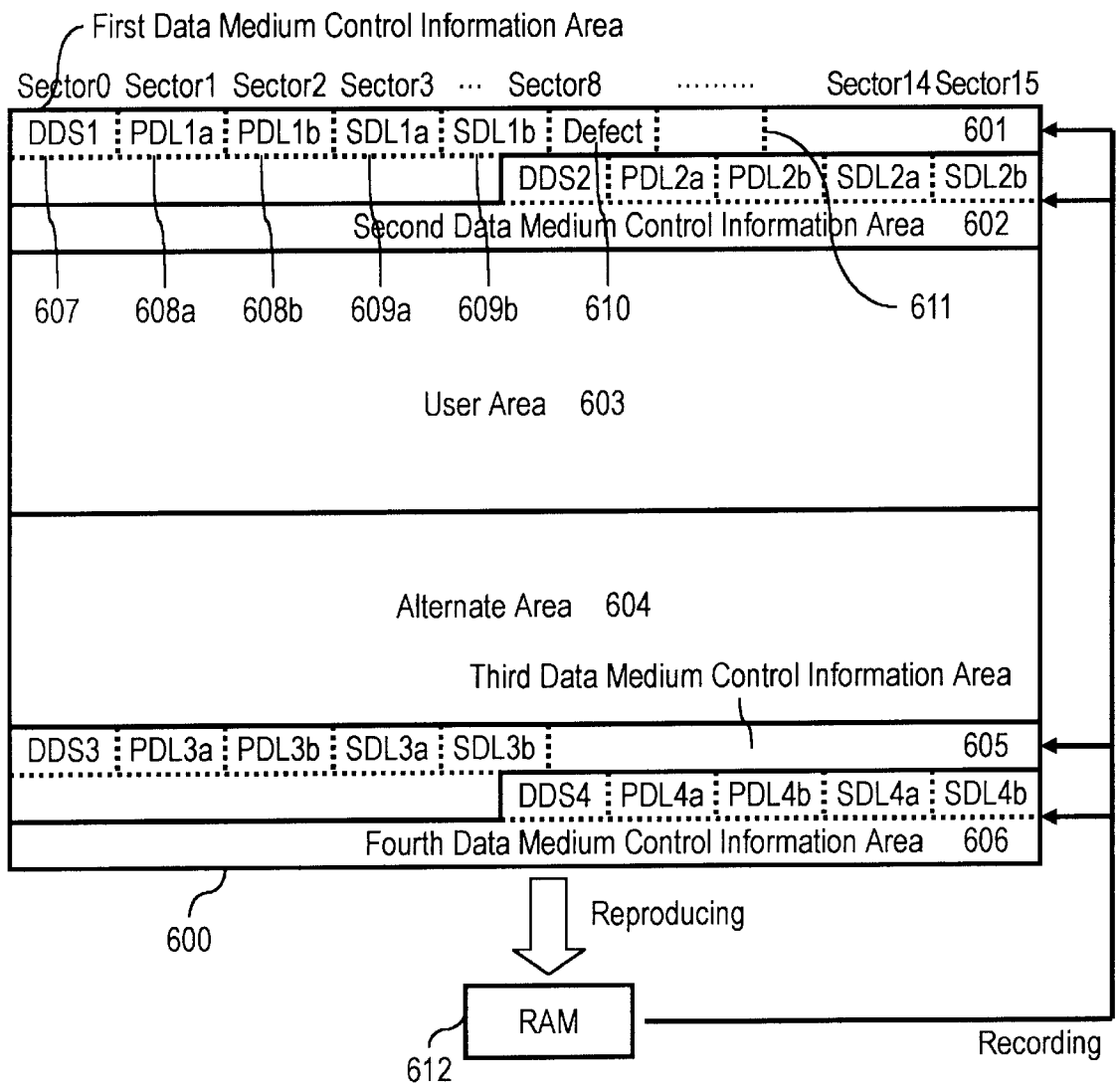
FIG. 12 is a layout diagram to show an example of a prior art data medium wherein 2 sectors of PDL and 2 sectors of SDL exist.
Figure 13:
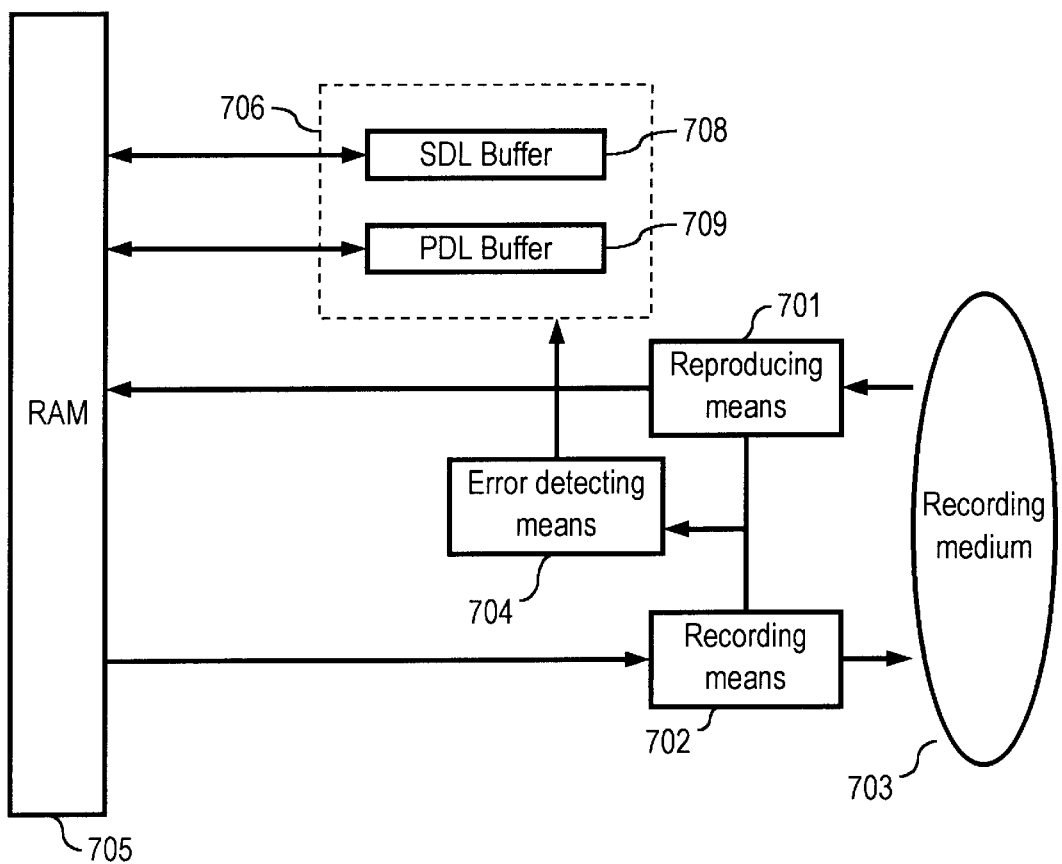
FIG. 13 is a block diagram of a prior art information recording/reproducing unit.

(2) An explanation will be made with reference to the flow chart as shown in FIG. 11. First of all, an used sector with the largest address is searched in the data medium control area and this address is designated as A.

In FIG. 9, the address of SDL 2 corresponds to this address.

Then, an unused sector address located immediately after A is searched and a recording is performed on the unused sector. When the recording has been performed normally, this address is added to an area storing the SDL address and the processing is ended. When the recording has not been performed normally, the next unused sector address is searched and an attempt is made to record the same content in an SDL sector on the foregoing next unused sector address. Accordingly, recordings on unused sectors are attempted one after another in the data medium control information area.

After recordings in unused sectors have been attempted one after another and when the ending address is reached in the data medium control area, the processing returns to the beginning of the data medium control area and an unused sector is searched. Recordings on unused sectors are further attempted one after another, and when the address A is again reached it is judged that no more unused sectors for normal recordings are available in this data medium control area.

When recordings have been performed normally, the addresses normally recorded are added to an area storing the SDL address and the processing is ended.

Accordingly, recordings can be performed without fixing the locations of data medium control information like PDL and SDL. Since the recordings in the present exemplary embodiment are not performed with the data medium control information situated only at the fixed locations in the same way as in the first exemplary embodiment, the aforementioned problems can be solved.

INDUSTRIAL APPLICABILITY

As described in the above, the information recording/reproducing unit and data medium of the present invention enable identifying the location of data medium control information and performing the recording/reproducing of data medium control information by adding identifiers, whereby recording locations of the information that constitutes data medium control information are identified within a data medium. Furthermore, performing recording/reproducing of data medium control information by possessing within the data medium a recording location of the information that constitutes positional information of data medium control information and utilizing the positional information of data medium control information has eliminated the possibilities of not recording data medium control information normally due to defective sectors and enabled recording of data medium control information securely in data medium, thereby allowing the reliability of an information recording/reproducing unit and data in recording medium for use in processing massive and important data to achieve improvements.

What is claimed is:

1. An information recording/reproducing unit for use with an optical disk for recording/reproducing data, said optical disk including a first data area for storing data and a second data area for storing data previously stored in a location of said first data area which becomes defective, said information recording/reproducing unit comprising:

recording means for recording data on said optical disk, said recording means also for recording a) alternative list values which indicate where, in said second area, said data previously stored in said first data area is located, wherein any of said alternative list values is movable from a respective first place on said optical disk which becomes defective to a second place, and b) a plurality of indicators which are used for locating said alternative list values; and reproducing means for reading data from said optical disk using said alternative list values.

2. An information recording/reproducing unit according to claim 1, wherein each of said alternative list values are situated in respective blocks, and said indicators are identifiers which are situated in the respective blocks of the respective alternative list values to which they correspond.

3. An information recording/reproducing unit according to claim 1, wherein said indicators are situated in an indicator location, and wherein said indicators are read from said indicator location by said reproducing means in order to locate said alternative list values.

4. An information recording/reproducing unit according to claim 1, wherein said recording means records a plurality of medium control information areas on said disk, each of said plurality of medium control information areas includes a copy of said indicators and a copy of said alternative list values.

5. An optical disk for recording/reproducing data, said optical disk comprising:

a first data area for storing data and a second data area for storing data previously stored in a location of said first data area which becomes defective;

alternative list values which indicate where, in said second area, said data previously stored in said first data area is located, wherein any of said alternative list values is movable from a first place on said optical disk which becomes defective to a second place; and a plurality of indicators which are used for locating said alternative list values.

6. An optical disk according to claim 5, wherein each of said alternative list values are situated in respective blocks, and said indicators are identifiers which are situated in the respective blocks of the respective alternative list values to which they correspond.

7. An optical disk according to claim 5, wherein said indicators are situated in an indicator location, and wherein said indicators are read from said indicator location by said reproducing means in order to locate said alternative list values.

8. An optical disk according to claim 5, wherein said recording means records a plurality of medium control information areas on said disk, each of said plurality of medium control information areas includes a copy of said indicators and a copy of said alternative list values.

* * * * *

UNITED STATES PATENT AND TRADEMARK OFFICE
CERTIFICATE OF CORRECTION

PATENT NO.    : 6,223,302 B1
DATED         : April 24, 2001
INVENTOR(S)   : Nakamura et al.

It is certified that error appears in the above-identified patent and that said Letters Patent is hereby corrected as shown below:

<u>Title page,</u>
Item [54], after "DATA" insert -- MEDIUM --.
Item [56], References Cited, FOREIGN PATENT DOCUMENTS, list:
-- 4-3368       1/1992  (JP)
61-34773        2/1986  (JP)
4-103082        4/1992  (JP) --

-- OTHER PUBLICATIONS
     Japanese language search report for Int'l Appln. No. PCT/JP96/02222 dated November 19, 1996.

English translation of Japanese search report. --

Signed and Sealed this

Eleventh Day of June, 2002

Attest:

Attesting Officer

JAMES E. ROGAN
Director of the United States Patent and Trademark Office